United States Patent
Stanhope et al.

(10) Patent No.: US 11,807,039 B2
(45) Date of Patent: Nov. 7, 2023

(54) COMPOSITE WHEEL CONSTRUCTION APPARATUS AND METHOD

(71) Applicant: LACKS ENTERPRISES, INC., Grand Rapids, MI (US)

(72) Inventors: Rawley Stanhope, Middleville, MI (US); Colin Snyder, Caledonia, MI (US); Frederick K. Meyer, Kentwood, MI (US)

(73) Assignee: Lacks Enterprises, Inc., Grand Rapids, MI (US)

( * ) Notice: Subject to any disclaimer, the term of this patent is extended or adjusted under 35 U.S.C. 154(b) by 821 days.

(21) Appl. No.: 16/781,390

(22) Filed: Feb. 4, 2020

(65) Prior Publication Data
US 2020/0247178 A1    Aug. 6, 2020

Related U.S. Application Data

(60) Provisional application No. 62/801,507, filed on Feb. 5, 2019.

(51) Int. Cl.
*B60B 5/02*    (2006.01)
*B29C 70/48*   (2006.01)
(Continued)

(52) U.S. Cl.
CPC .............. *B60B 5/02* (2013.01); *B29C 70/48* (2013.01); *B60B 21/02* (2013.01);
(Continued)

(58) Field of Classification Search
CPC .................................. B60B 5/02; B60B 21/02
See application file for complete search history.

(56) References Cited

U.S. PATENT DOCUMENTS 4,636,344 A * 1/1987 McDougall ............... B60B 5/02
                                                         264/108
5,985,072 A * 11/1999 Finck .................... B29C 70/222
                                                         156/169
(Continued)

FOREIGN PATENT DOCUMENTS

KR    20190134132 A  * 12/2019  ............. B60B 21/00
WO    WO-2015069111 A1 * 5/2015  ............. B29C 70/32

*Primary Examiner* — Scott A Browne
(74) *Attorney, Agent, or Firm* — Dickinson Wright PLLC

(57) ABSTRACT

A composite wheel structure includes a single continuous fiber reinforcement layer extending axially between inner and outer ends of the wheel structure. The single fiber reinforcement layer is impregnated with different matrix materials at different axial portions of the reinforcement layer to account for specific locations where high strength or high temperature performance is needed, with other portions having different matrix materials where low temperature performance and/or low strength is sufficient. The matrix materials may be provided as separate resin films that are applied side-by-side on the single reinforcement layer, or they may be provided on a single resin film. The matrix materials may be applied to the reinforcement layer in a direct coating process. The reinforcement layer may be prepregged with the matrix materials prior to a wheel layup process, or the reinforcement layer and matrix materials may be consolidated by resin film infusion during the wheel layup process.

20 Claims, 3 Drawing Sheets

(51) Int. Cl.
*B60B 21/02* (2006.01)
*B29K 63/00* (2006.01)
*B29K 105/08* (2006.01)
*B29K 79/00* (2006.01)
*B29L 31/32* (2006.01)

(52) U.S. Cl.
CPC ...... *B29K 2063/00* (2013.01); *B29K 2079/08* (2013.01); *B29K 2105/0881* (2013.01); *B29L 2031/32* (2013.01); *B60B 2310/242* (2013.01); *B60B 2360/3412* (2013.01); *B60B 2360/3416* (2013.01); *B60B 2360/3418* (2013.01); *B60B 2900/212* (2013.01); *B60B 2900/311* (2013.01); *B60B 2900/513* (2013.01)

(56) References Cited

U.S. PATENT DOCUMENTS

| | | | | |
|---|---|---|---|---|
| 11,110,742 | B2* | 9/2021 | Chenault, III | B60B 3/041 |
| 2014/0117745 | A1* | 5/2014 | Wilke | B60B 21/08 |
| | | | | 204/192.15 |
| 2017/0349004 | A1* | 12/2017 | Iwai | B60B 21/08 |

* cited by examiner

COMPOSITE WHEEL CONSTRUCTION APPARATUS AND METHOD

CROSS-REFERENCE TO RELATED APPLICATIONS

This application claims the benefit of previously filed U.S. Provisional Patent Application No. 62/801,507, filed Feb. 5, 2019, titled "COMPOSITE WHEEL CONSTRUCTION APPARATUS AND METHOD," the entire content of which is hereby incorporated by reference herein in its entirety.

FIELD

The present disclosure relates to a vehicle wheel construction. More particularly, the present disclosure relates to a vehicle wheel construction including multiple matrix materials across the width of the wheel.

BACKGROUND OF THE DISCLOSURE

Passenger vehicle wheels are known in the art, and are typically formed of one or more materials to define the shape of the wheel. The wheel may be sized and shaped such that it is configured to support a tire mounted thereon, and such that the wheel may be mounted to a rotatable axle so the wheel can be driven by a vehicle transmission and rotated in response to the vehicle being driven.

Different portions of the wheel have different strength or temperature requirements based on the different functions performed by the different portions. Accordingly, the wheel may have various thicknesses, fiber angles, and/or carbon fiber materials that are used throughout the different wheel portions or areas.

For example, a typical wheel may include a pair of tire bead flanges, such as an inner bead flange and an outer bead flange. The bead flanges typically must have very high impact performance and toughness to perform well when subjected to a pothole impact. Thus, increasing the toughness at this area is advantageous.

It is also known that in the area of the wheel that interfaces with the vehicle brake calipers, it is desirable to have an elevated temperature performance, such that the wheel material can sufficiently withstand the increased temperatures that result from the friction generated during a braking operation.

Typical composite wheel manufacturing processes utilize the same resin or material matrix for the entire wheel construction. This process therefore results in a single material being used for each of the areas of the wheel. Wheels may be manufactured using the same resin and varying the radial thickness of the wheel to provide different strengths at different portions of the wheel. Nevertheless, the use of the same matrix material will result in a compromise between strength, temperature performance, and cost.

One solution for the different requirements of the wheel is the use of different resins for different portions of the wheel. In some approaches, different resins can be "co-cured" to produce a wheel with different strength and temperature performance at different locations.

Various approaches may be used to construct a wheel with different resins. In one approach, a first preform is constructed which includes one matrix system, which may be uncured or already cured. A second preform may be constructed using a different matrix system, which may be cured or uncured. The preforms may then be placed in a mold together and then cured together.

In another approach, a preform, such as a fiber preform, may be placed in a Resin Transfer Mold (RTM), where a liquid thermoset resin is used to saturate the fiber preform in a closed mold. The result is that the preform becomes embedded in the thermoset resin. In this approach, a first matrix system may be infused into one region of the preform, and a second matrix system is infused into another region of the preform. The two matrix systems may then be cured together to define an overall composite with the embedded preform.

The above-described methods are typically used for simplifying the bonding of multiple composite parts. The result is typically a difference in thickness along the axial width of the wheel. Put another way, there can be multiple layers of material. In this approach, each layer uses the same matrix, but some of the layers along the thickness of the wheel have different properties.

In the above-described approach, the reinforcement materials are not continuous across the multiple resin regions. Put another way, one reinforcement area with a first resin material will overlap another portion with a reinforcement area with a second resin, such that the first resin overlaps the second resin at an increased thickness area. This method is known as an overlap method, and is illustrated in FIG. 1.

In another approach, known as the splice method and shown in FIG. 2, a first resin material is formed in layers with different lengths, such that a middle layer may have a longer length, and is received in a recess formed between layers, with the second resin material having a shorter length such that the longer length can be received in a recess defined by the shorter length.

The overlap and/or seam that is created in these prior art solutions is undesirable and can create a part that is overly bulky or lacking in a desirable strength.

In view of the above, improvements can be made to the construction of composite vehicle wheels.

SUMMARY OF THE DISCLOSURE

It is an aspect of this disclosure to provide a composite wheel structure with different strength and temperature characteristics in different axial portions of the wheel.

It is another aspect of this disclosure to provide a composite wheel structure with a continuous reinforcement layer.

It is a further aspect of this disclosure to provide a composite wheel structure with a reduced cost.

In accordance with the above and the other aspects of the disclosure, in one aspect, a composite wheel structure is provided including a wheel body having an axial width extending between an inner end and an outer end. The wheel structure includes an inner flange portion of the wheel body disposed at the inner end and an outer flange portion of the wheel body disposed at the outer end.

A first intermediate portion of the wheel body is disposed between the inner flange portion and the outer flange portion. A second intermediate portion of the wheel body is disposed between the first intermediate portion and the outer flange portion.

A first reinforcement layer of material extends between the inner and outer ends and extends through the inner flange portion, the outer flange portion, the first intermediate portion, and the second intermediate portion. The first reinforcement layer is in the form of a single continuous fiber layer.

A first matrix material is integrated with the first reinforcement layer along the inner flange portion. A second matrix material is integrated with the first reinforcement layer along the first intermediate portion. A third matrix material is integrated with the first reinforcement layer along the second intermediate portion.

In one aspect, the outer flange portion and inner flange portion each include the first matrix material.

In one aspect, the first matrix material has high toughness and low temperature performance.

In one aspect, the second matrix material has high temperature performance and low toughness.

In one aspect, the third matrix material has low temperature performance and low toughness.

In one aspect, the second matrix material comprises a Bismaleimide polymer and the first and third matrix materials are epoxy.

In one aspect, the first reinforcement layer is a carbon fiber fabric, Kevlar, or fiberglass.

In one aspect, the first reinforcement layer is seamless across the axial width of the wheel body.

In one aspect, the first, second, and third matrix materials are joined with the first reinforcement layer in a single layer, such that the single reinforcement layer includes different matrix materials across its width.

In one aspect, the composite wheel structure further includes at least one additional reinforcement layer overlaying the first reinforcement layer, wherein the at least one additional reinforcement layer is continuous and seamless and includes multiple different integrated matrix materials across an axial width thereof.

In another aspect, a method of forming a composite layer for use in a composite wheel layup process is provided. The method includes the steps of providing a single reinforcement layer in the form of a continuous fabric material having a lateral width. The method further includes applying a first matrix material onto a first portion of the reinforcement layer and applying a second matrix material onto a second portion of the reinforcement layer. The method also includes consolidating the first and second matrix materials and the reinforcement layer into a single composite layer.

In one aspect, the step of consolidating includes prepregging the reinforcement layer with the first and second matrix materials.

In one aspect, the step of consolidating includes applying pressure and heat to the reinforcement layer and the first and second matrix materials.

In one aspect, the step of consolidating includes using a resin film infusion process.

In one aspect, the method further includes providing a substrate having a length and a width; applying the first matrix material to the substrate across a first portion of the width; applying the second matrix material to the substrate across a second portion of the width; defining a single resin film that includes the first and second matrix materials applied to the substrate; wherein the steps of applying the first and second matrix materials includes overlaying the single resin film on the reinforcement layer.

In one aspect, the method further includes providing a first substrate having a length and a width; applying the first matrix material to the first substrate across the width thereof; providing a second substrate having a length and a width; applying the second matrix material to the second substrate across the width thereof; defining a first resin film that includes the first matrix material applied to the first substrate; defining a second resin film that includes the second matrix material and the second substrate; wherein the steps of applying the first and second matrix materials includes overlaying the first resin film and the second resin film onto the reinforcement layer.

In one aspect, the first matrix material and the second material are applied to the reinforcement layer side-by-side during a first time period.

In one aspect, the first matrix material and the second matrix material are applied to the reinforcement layer side-by-side, with the first matrix material applied during a first time period and the second matrix material applied during a second time period.

In one aspect, the single composite layer is formed with the single reinforcement layer impregnated with first and second matrix materials across the width of the reinforcement layer, wherein the first and second matrix materials do not overlap across the width of the reinforcement layer, and the reinforcement layer is seamless.

In one aspect, the first and second matrix materials are applied to the reinforcement layer using a direct reinforcement coating process in which the first and second matrix materials are directly applied to the reinforcement layer without previously applying the matrix materials to a substrate.

In yet another aspect, a composite wheel structure is provided that includes a wheel body having an axial width extending between an inner end and an outer end. The wheel structure includes a first axial portion of the wheel body, and a second axial portion of the wheel body.

The structure further includes a fabric reinforcement layer in the form of a single axially continuous layer extending through the first and second axial portions. The reinforcement layer is impregnated with a first matrix material along the first axial portion and a second matrix material along the second axial portion.

A BRIEF DESCRIPTION OF THE DRAWINGS

Other aspects of the present disclosure will be readily appreciated, as the same becomes better understood by reference to the following detailed description when considered in connection with the accompanying drawings wherein.

DESCRIPTION OF THE DISCLOSURE

Figure 3:
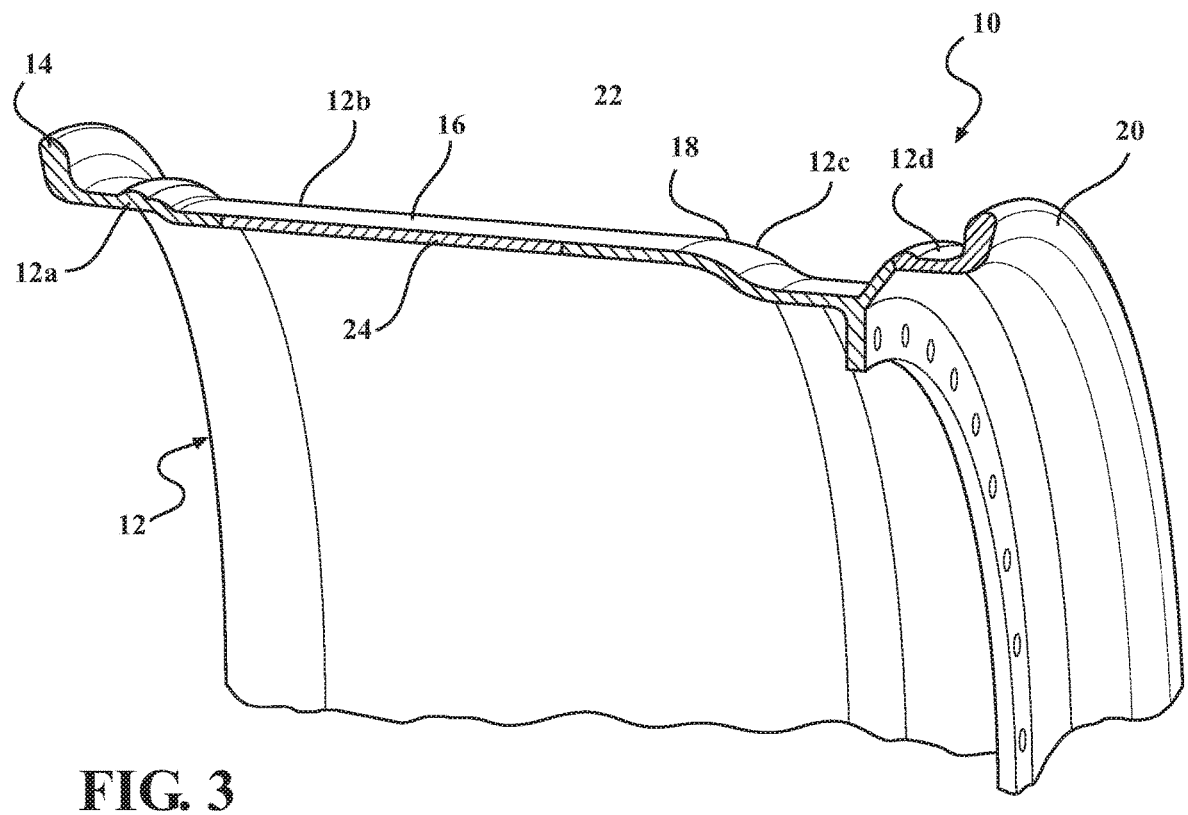
FIG. 3 is fragmentary perspective view of a composite wheel having multiple matrix materials across an axial width of the wheel.

Referring to FIG. 3, a vehicle wheel 10 construction is provided having multiple matrix materials across the axial width of the wheel 10. The wheel 10 may include a wheel body 12 having multiple axial zones, areas, or portions 12a, b, c, d, etc. The body portions may be referred to generally using the reference numeral 12, with specific zones being referred to as 12a, b, c, d, etc.

Figure 1:
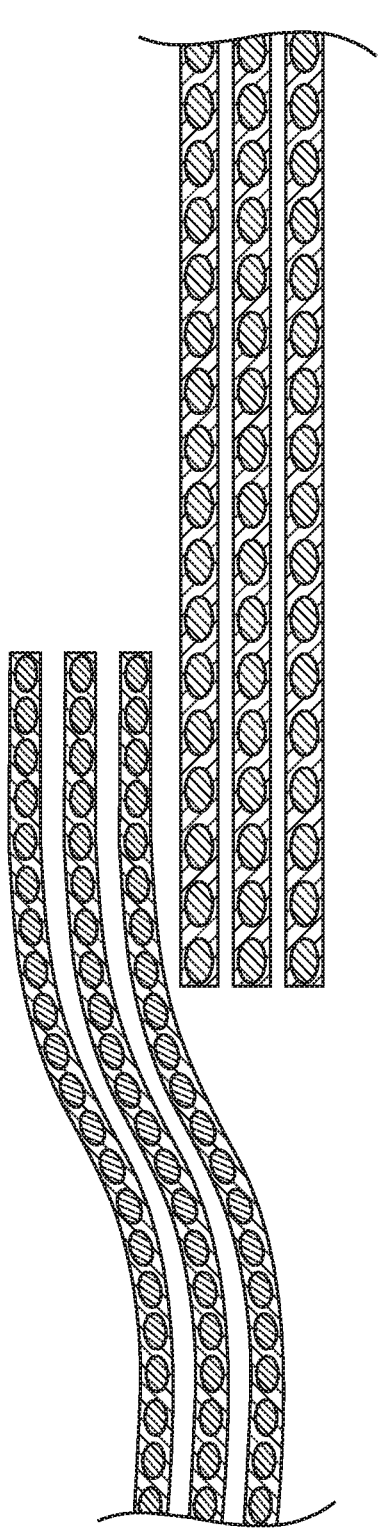
FIG. 1 is a schematic view of a prior art system in which multiple matrix materials and multiple reinforcement layers overlap each other.
Figure 2:
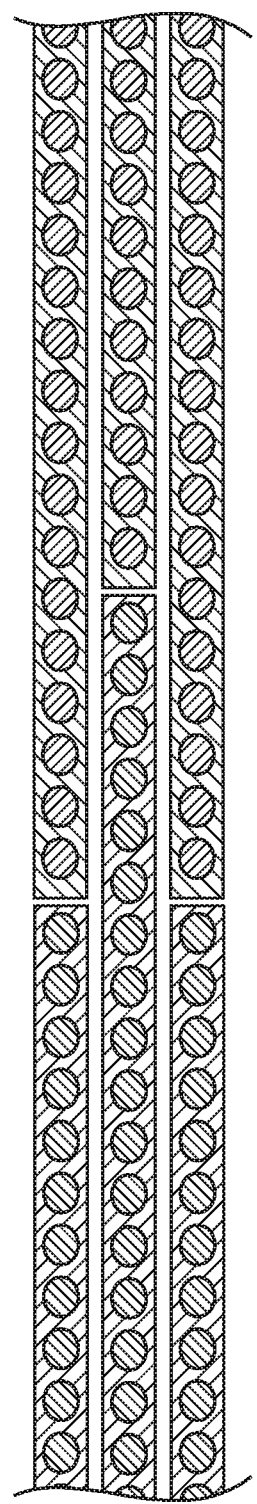
FIG. 2 is a schematic view of a prior art system in which multiple matrix materials and multiple reinforcement layers are spliced together.

The zones 12 may be formed as a continuous fiber layer having different resin materials used in the different zones 12. As shown in FIG. 1, a first zone 12a may be disposed at and may define an axially inner end portion of the wheel 12, and may further define an inner bead 14. A second zone 12b may extend generally axially outwardly away from the first zone 12a, and may define a generally cylindrical portion 16. A third zone 12c may extend generally axially outwardly from the second zone 12b, and may define a curved or tapered cross-section with a diameter that reduces relative to the second zone 12b along the axial width of the wheel 10, which may be described as a curved portion 18 or stepped portion. A fourth zone 12d may extend generally axially outwardly from the third zone 12c, and may have a diameter that increases relative to the third zone 12c. The fourth zone 12d may define an outer bead 20. it will be appreciated that the reference to extending generally axially outwardly refers to the general direction away from the inner bead 14, and may include tapering or other complex diameter changes, and should not necessarily be interpreted as extending parallel to the rotational axis of the wheel due to the possible tapering and diameter changes.

It will be appreciated that the illustrated arrangement and number of zones 12 may be modified in accordance with design needs. As further described below, the illustrated zones 12a-12d may be tailored to accommodate a particular use environment, such as for temperature resistance or strength at different areas. Of course, given the various temperature and strength needs for different designs, additional zones may be included, or the relative sizes of the illustrated zones 12a-12d may be modified. For purposes of further discussion, the number and arrangement of zones 12a-12d will be referenced herein.

The inner bead 14 and the outer bead 20 may be sized and configured to support a tire (not shown) in a traditional manner, such that the tire may be inflated when mounted and sealed to the wheel 10 in a manner known in the art.

The zones 12 may combine to define an outer surface 22 and an inner surface 24. The outer surface 22 faces radially outward and combines with a mounted tire to define an interior space within the tire in which pressurized air may be introduced to inflate the tire. The inner surface 24 faces radially inward and toward the axis of the rotation of the wheel. The inner surface 24 may be the surface that interfaces with a vehicle braking mechanism or is disposed near or adjacent a braking mechanism (not shown). The braking mechanism, as is known, will generate a substantial amount of heat during operation. In one approach, the third zone 12c that defines the curved portion 18 is the area of the wheel 10 that may interface or be disposed adjacent or near the brake mechanism, and may therefore be the portion of the wheel 10 that receives a large amount of heat from the braking mechanism.

However, it will be appreciated that other zones of the wheel 10 may be subjected to increased temperature due to braking mechanisms, or the like. Accordingly, it will be appreciated that the zone 12c may extend further axial distances to include these areas of increased temperatures. In another aspect, the zone 12b illustrated in FIG. 3 may be the zone that is subjected to increased temperature. For the purposes of discussion, the illustrated zone 12c is the zone subjected to increased temperature.

The inner bead 14 and the outer bead 20 have larger outer diameters relative to the cylindrical portion 16 and the curved portion 18, and are the portions that directly support the tire that is mounted to the wheel 10. Accordingly, the inner bead 14 and the outer bead 20 are the portions of the wheel 10 that receive the majority of an impact load, for instance when impacting a pothole or other road imperfection or bump. The inner bead 14 and outer bead 20 are therefore preferably constructed with high strength and toughness to resist such loads and to prevent or otherwise limit damage in the wheel 10 that could lead to depressurization of the tires and require replacement.

Unlike areas of the wheel 10 disposed near braking mechanisms, the inner bead 14 and the outer bead 20 of the wheel 10 do not typically undergo significant temperature increases during operation. Accordingly, the first zone 12a and the fourth zone 12d may be constructed with a high toughness material but without requiring high temperature performance. Put another way, these zones defining the inner bead 14 and outer bead 20 may have high toughness performance but low temperature performance. In one approach, the resin used for these zones may be an epoxy resin material but it is understood this may be any polymeric or non-polymeric material. As used herein, the various materials that can be used in the various zones may also be referred to as matrix materials.

The third zone 12c may be the zone that receives a large amount of heat because of its proximity to the brake caliper. In operation, this region of the wheel 10 may undergo temperatures as much as 300 degrees F. above the other zones of the wheel 10. In one approach, a polymer from a different polymer family relative to the first and fourth zones 12a and 12d may be used. For example, a polymer from the Bismaleimide family may be used in the third zone 12c, while the other zones use an epoxy. In general, the matrix material used in this zone 12c may have a higher temperature performance and consequently a lower toughness than the matrix materials used in zones 12a and 12d. The third zone 12c is disposed radially inward relative to the inner bead 14 and the outer bead 20, and therefore does not undergo substantial impact forces from potholes and the like. Accordingly, the third zone 12c may have a relative low toughness performance.

As used herein, reference to low, high, or the like in toughness performance or temperature performance is intended to refer to performance levels relative to other portions of the wheel 10. For example, the zone 12c having a relative low toughness performance may be understood to mean a lower toughness performance relative to the zones 12a and 12d. Similarly, the zones 12a and 12d having a relative high toughness performance may be understood to mean a higher toughness performance than the zone 12c.

The second zone 12b, which is disposed axially between the first zone 12a (requiring high toughness but allowing low temperature performance) and the third zone 12c (requiring high temperature performance but allowing low toughness), may be constructed to have both low toughness and low temperature performance. The second zone 12b may have this low toughness and low temperature performance because this zone does not receive substantial impact loads because it is radially recessed relative to the inner bead 14 and the outer bead 20, and further because it does not undergo substantially high temperatures like the third zone 12c. Thus, the second zone 12b may be constructed using low cost materials because it does not require these levels of high performance. In this aspect, the second zone 12b having low toughness and temperature performance may be understood to mean a lower toughness performance relative to the zones 12a and 12d and a lower temperature performance relative to zone 12c.

Moreover, it will be understood that different zones both being described as having low toughness performance may have differing levels of toughness performance relative to each other. For example, with both the zones 12b and 12c having low toughness performance relative to the zones 12a and 12d, one of the zones 12b or 12c may have a lower toughness performance than the other of zone 12b or 12c.

For the purposes of illustration regarding temperature and strength performance, the following exemplary performance values may be used herein.

Low temperature performance may have a Tg between 80 C and 120 C. High temperature performance may have a Tg above 180 C. Tg refers to the glass-liquid transition, or glass transition, value. Glass-liquid transition, or glass transition, is the gradual and reversible transition in amorphous materials (or in amorphous regions with semicrystalline materials) from a hard and relatively brittle "glassy" state into a viscous or rubbery state as temperature is increased. The glass-transition temperature Tg of a material characterizes the range of temperatures over which this glass transition occurs. The Tg value is lower than the melting temperature of the crystalline state of the material, if one exists.

High toughness performance may refer to a fracture toughness of 1000 $J/m^2$ to 2000 $J/m^2$. Low toughness performance may refer to a fracture toughness of less than 500 $J/m^2$.

Figure 4A:
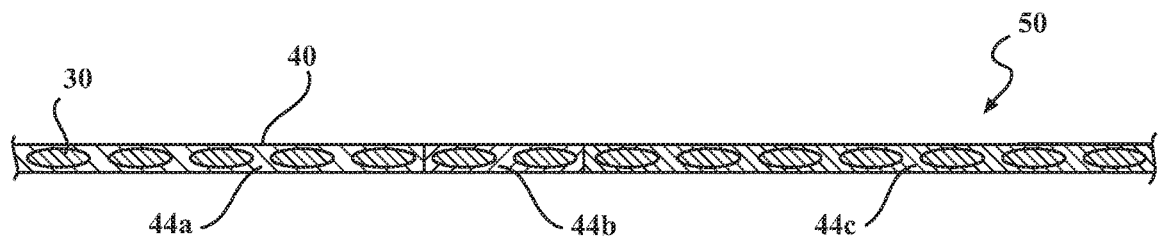
FIG. 4A is a schematic cross-sectional view illustrating a continuous reinforcement layer having multiple matrix materials, showing the reinforcement layer after consolidating the reinforcement layer and the multiple matrix materials.
Figure 4B:
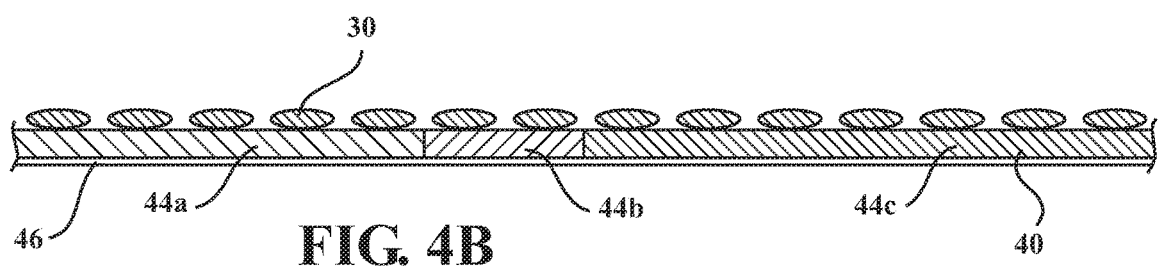
FIG. 4B is a schematic cross-sectional view illustrating a continuous reinforcement layer having multiple matrix materials, showing the reinforcement layer before consolidating the matrix materials with the continuous reinforcement layer.

With reference to FIG. 4, the multiple zones of the wheel body 12 may be constructed in a continuous manner, unlike the prior art solutions of overlapping or splicing of reinforcements utilizing different matrix systems and separate fiber reinforcement. Rather, the multiple zones of the body 12 of the wheel 10 may have a continuous single fiber reinforcement layer 30, but with multiple different matrix or resin materials across the axial width of the reinforcement layer 30. For example, the single layer 30 may act as the base, skeleton, body, or the like to which the various resin formulations and/or matrix materials are incorporated in the reinforcement layer 30, which may be in the form of a preform. Incorporating the resin formulations into the preform is performed at the reinforcement level. Alternatively, the incorporation of the resin formulations can be performed at the component level or laminate level.

The reinforcement layer 30 may be made from a carbon-fiber fabric, fiberglass, Kevlar, or similar material suitable for acting as a continuous reinforcement layer. The resin materials or formulations that are carried on the reinforcement layer 30 can be joined with the reinforcement layer 30 in different ways. For purposes of discussion, the combined resin materials may be referred to as a resin layer 40.

In one approach, the resin or matrix materials, in the form of films or layers, can be fully consolidated with the reinforcement layer 30 before the wheel layup process. When the resin or matrix materials are consolidated with the reinforcement layer 30, this may be referred to as the reinforcement layer 30 being impregnated. When the matrix materials and reinforcement layer 30 are consolidated and impregnated prior to the wheel layup process, this approach may be referred to as "prepregged," where a consolidated preform is defined that can be applied to a mold during the layup process.

In another approach, one or more resin films or layers 40 may be defined, having one or more matrix materials carried on a substrate, and can be applied to the mold along with the reinforcement layer 30 during the wheel layup process. The reinforcement layer 30 and the resin film can be then be consolidated on the mold in a resin film infusion molding process, also known as "RFI." In this approach, the layers are not "prepregged" because the impregnating occurs on the mold in response to the RFI process. In another approach, a portion of the resin layer 40 is devoid of resin film, leaving a portion of the reinforcement layer 30 uncovered by the resin film layer 40. The consolidated reinforcement and resin film layer 50 can be prepregged or utilize the RFI process. During consolidation and cure, the portion of the reinforcement layer 30 devoid of resin can be infused with resin from the adjacent material zones. Alternatively, this portion of the reinforcement layer 30 can be infused with a resin supplied via resin transfer molding or other infusion process during the molding and curing process.

In either the prepregged process or the RFI process, the matrix materials and the reinforcement layer 30 become consolidated in the consolidated layer 50 in response to the application of heat and pressure.

The various resin materials that may be used for the different zones 12a-12d across the width of the reinforcement layer 30 can be applied as separate films or layers 40 for each material, or as one film or layer 40 with regions of differing resin material. Separate films 40 may be combined with the single reinforcement layer 30 in the prepregged approach or the RFI approach. Similarly, a single layer 40 of multiple resins may be combined with the reinforcement layer 30 in the prepregged approach or the RFI approach. The selection of the prepregged approach vs. the RFI approach can depend on the particular manufacturing capabilities or needs of the user. For example, prepregged layers may require specific handling or storage requirements, and the RFI process may require a specific type of molding equipment.

In the prepregged approach, the resin layer 40 and the reinforcement layer 30 are heated and partially or completely consolidated together to define the single composite layer 50, which includes both the reinforcement layer 30 and the resin layer 40, as shown in FIG. 4A. The fabric-like structure of the reinforcement layer 30 is embedded within the resin layer 40 when the single composite layer 50 is formed. Multiple composite layers 50 may be prepregged, which may then be applied on a mold for performing the wheel layup process.

In the RFI approach, the resin layer 40 and reinforcement layer 30 may be separately placed on the wheel mold, and the RFI process is performed that will consolidate and bond the resin layer 40 to the reinforcement layer 30 under heat and pressure, which will impregnate the resin layer 40 with the reinforcement layer 30 on the mold, creating a molded composite layer 50 in the shape of the mold. FIG. 4A also illustrates the resulting composite layer 50 of the RFI approach having both the reinforcement layer 30 and the resin layer 40 in a single layer.

In each of the above processes, the resin layer 40 is provided and produced before being applied to the reinforcement layer 30. As described above, multiple resin materials are used across the width of the reinforcement layer 30. In the above-described example, there are four zones of the wheel 10 having different toughness or heat requirements and can therefore be four different materials that meet the particular requirements of each zone or region. The resin layer 40 can therefore be provided having multiple materials across its width. The resin layer 40 may include a substrate that may be used to receive the matrix materials, which can later be peeled away.

Figure 5:
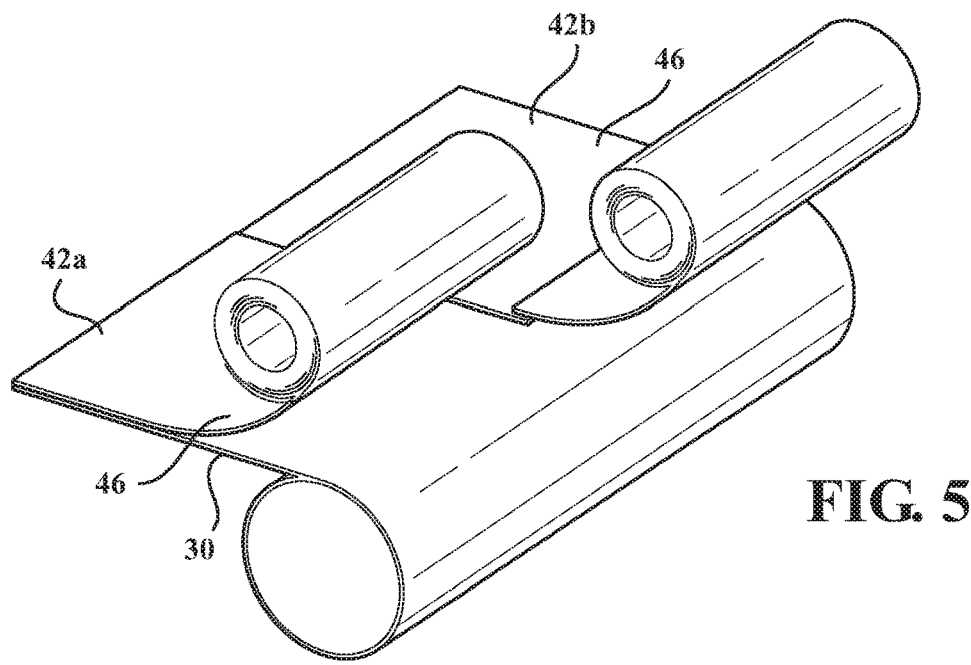
FIG. 5 is a perspective view illustrating multiple matrix films being applied to a single reinforcement layer.

The resin layer 40 can be in the form of multiple separate layers 42*a*, 42*b*, etc. (FIG. 5), or the resin layer can be in the form of a single layer with multiple resin portions 44*a*, 44*b*, 44*c*, etc. (FIG. 4). It will be appreciated that FIG. 4 may illustrate either a single layer with multiple resin portions or multiple layers laid side-by-side. FIG. 5 shows an example of multiple separate layers. In each of these cases, the resin layer(s) 40 may be produced prior to being applied to the reinforcement material 30. In the case of separate layers, the resin layer 40 may become a single layer after the separate layers have been consolidated with the reinforcement layer 30. In each of these cases, the resin or matrix material forming the layers or portions may be applied to a substrate 46.

The substrate 46 may be a layer of material on which the resin or matrix materials can be applied, such that the resin layer 40 may be produced and carried on the substrate 46 for later application to the reinforcement layer 30. The substrate 46 may be a paper, polymeric, or other material suitable to act a substrate for a resin material.

In one approach, which may be referred to as the multiple film approach and shown in FIG. 5, the multiple separate resin layers 42*a, b*, etc. each having a different resin material are produced separately and on separate substrates 46. It will be appreciated that different substrate materials could be used for the separate layers. It will be further appreciated that the same resin materials could be used in separate layers 42*a, b*, etc. and laid adjacent each other or separated by a layer of a different resin material, depending on the desired performance of the resin material along the width of the reinforcement layer 30. For example, a first resin material may be used for layer 42*a*, a second resin material may be used for layer 42*b*, and the first resin material may be used for layer 42*c*. Or the first material may be used for both zone 42*a* and 42*b*, and a second material may be used for zone 42*c*. The use of different separate layers 42 thereby allows for a modular assembly of resin materials across the width of the reinforcement layer.

The resin films or layers 42 can be produced using various filming processes. For example, the layers 42*a, b*, etc. may be produced by gravure coating, reverse roll coating, knife-over-roll coating, metering rod coating, slot die coating, curtain coating, all knife coating, spray coating, powder coating, or any other known coating technique. The filming processes, when complete, may therefore produce the multiple separate resin layers 42*a, b*, etc. It will be appreciated that different layers could be made by different coating processes.

With the multiple layers 42 being produced, they may then be applied to the reinforcement layer 30 for the laminating process. The reinforcement layer 30 and the resin layers 42 may be in the form of a roll of material. The reinforcement layer 30 may be provided, with the separate layers 42 being applied over a surface of the reinforcement layer 30.

In one approach, one of the layers 42 may be applied to the reinforcement layer 30 first, thereby covering a portion of the width of the reinforcement layer 30. The reinforcement layer 30 and the resin layer 42 may then be laminated together, providing a portion of the reinforcement layer 30 in a laminated state. Subsequent resin layers 42 may be applied and laminated in a similar and sequential manner, until the entire width of the reinforcement layer 30 has been covered (or the entire desired amount of the reinforcement layer 30 has been covered). With the multiple matrix materials applied to the reinforcement layer 30, heat and pressure may be applied to consolidate the layers according to the prepregged approach or the RFI approach.

In the RFI approach, the reinforcement layer 30 may be placed on the wheel mold separately from the matrix material layers 42, or the layers may be laminated together and then applied to the mold. In either version of the RFI approach, the layers 42 will be consolidated on the mold to arrive at the consolidated layer 50 illustrated in FIG. 4A.

In another approach, each of the layers 42 may be applied to the reinforcement layer 30 side-by-side generally simultaneously or during the same time period. In this approach, the rolls of the layers 42 may be located side by side and the lamination may occur at the same distance along the reinforcement layer 30. Put another way, at a given longitudinal location along the reinforcement layer 30, the multiple layers 42 may be applied across the width at the same longitudinal location.

This approach of applying multiple separate layers 42 to the reinforcement layer 30 can thereby provide a laminated and prepregged composite layer 50 that may be applied to the wheel mold in the wheel layup process, or a laminated assembly of layers that can be consolidated in the RFI approach. In the prepregged approach, heat and pressure are applied to the overlaid reinforcement layer 30 and layers 42, and the consolidated layer 50 is placed on or in the wheel mold. In the RFI approach, the overlaid layers 30 and 42 are placed on or in the mold prior to applying heat and pressure to create the consolidated layer 50.

Figure 6:
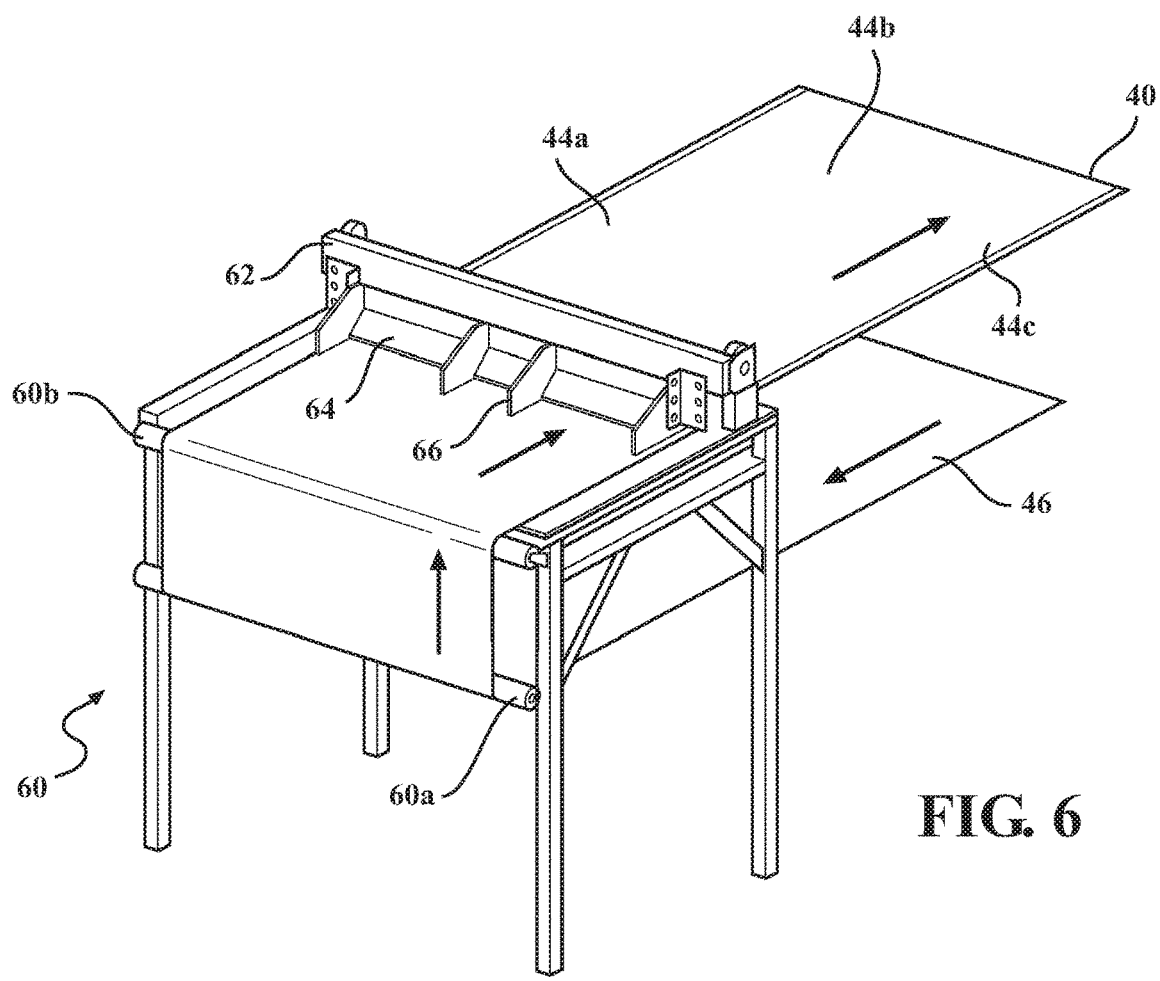
FIG. 6 is a perspective view of a manufacturing setup illustrating multiple matrix materials being applied to a single substrate for later being applied to a single reinforcement layer.

With reference to FIG. 6, in another aspect, the resin layer 40, in the form of a single layer with multiple portions 44*a, b, c*, etc., can be produced and subsequently laminated with the reinforcement layer 30. In this approach, the resin layer 40 may be produced using a filming process in which multiple resin formulations are applied to the substrate 46 at approximately the same time. An example of such a filming process is shown in FIG. 6, in which a filming setup 60 for a knife-over-roll process is illustrated.

In this approach, the substrate 46 may be fed in a first direction toward a lower roller 60*a*, and directed upward toward an upper roller 60*b*. At the upper roller 60*b*, the substrate 46 is directed in a second direction that is opposite the first direction. The substrate 46 may be fed in the second direction toward a doctor blade head 62 having multiple sections 64 with damming 66 disposed between the sections 64. Each section 64 may include a different resin formulation. Thus, as the substrate 46 passes through the sections 64, the different resin formulations may be applied to the substrate 46.

It will be appreciated that in some aspects, the substrate may be fed toward the doctor blade head 62 in another manner, and not necessarily using the two-roller setup illustrated in FIG. 6.

As the substrate 46 passes through the sections 64 and the doctor blade head 62, the resin layer 40 will be formed having different resin material formulations disposed across the width of the substrate 46, yielding a single resin layer 40 with multiple zones. The resin layer 40 may then be removed from the setup 60.

With the resin layer 40 produced using this process, the resin layer 40 is in the form of a single layer, and may then be combined with the reinforcement layer 30 to create the composite layer 50 in a manner similar to that described above for multiple layers. The single resin layer 40 may be applied to the reinforcement layer 30, and heat and pressure may be applied to the resin layer 40 and the reinforcement layer 30 to form the prepregged composite layer 50. The composite layer 50 may then be applied to the mold in the wheel layup process. Alternatively, the single resin layer 40 may be applied to the reinforcement layer, and consolidated as part of an RFI process in the mold.

It will be appreciated that the single layer 40 having multiple different resin zones may also be combined with additional separate layers, and overlaid with the reinforcement layer 30 in a manner similar to that described above for multiple layers 42.

In yet another approach, similar to the above-described approach for forming the single resin layer 40, the substrate material 46 may be fed through multiple filming stations to apply to the multiple resin formulations to the single substrate 46, rather than a single filming station where the resin formulation are added at approximately the same longitudinal location. For example, the substrate 46 may be passed through a first filming station, and the resin material may be applied across a portion of the width of the substrate 46. The substrate 46 may continue to be advanced to a subsequent filming station, where another resin material may be applied across a different portion of the width of the substrate 46. This process may be continued until the desired width of the substrate 46 is covered with the desired resin materials.

In yet another approach, one resin material may be applied to a portion of the substrate 46 at a first filming station, and then multiple resin materials may be applied at a subsequent filming station. For example, a first resin formulation may be applied at a first filming station, and then second and third resin formulations may be applied at the same filming station, with regions separated by damming or the like.

Similar to the above, once all of the desired resin materials have been applied to the substrate 46, the single resin layer 40 may be removed and then applied to the reinforcement layer 30, and they can then be combined under heat and pressure to define a prepregged composite layer 50. The composite layer 50 may then be applied to the wheel mold in the wheel layup process. Attentively, the single resin layer 40 and the reinforcement layer 30 may be consolidated on the mold using an RFI process.

The above-described methods have related to create a prepregged composite layer 50 that is subsequently applied to the wheel mold or creating an assembly of layers for an RFI process that creates a consolidated layer 50 in the mold. In both cases, a resin layer 40 is produced and then combined with a single reinforcement layer 30 under pressure and heat to consolidate the layers. However, the resin material may be applied in other ways, as well.

In one aspect, a direct reinforcement coating process may be used to apply the different resin or matrix materials to the single reinforcement layer 30. In this approach, the substrate material and the separate resin layer may not be used in the manner described above. Instead, the resin material may be applied directly to the reinforcement layer 30. The reinforcement layer 30 may be optionally placed over a backing material, such as a substrate, table, roller, or the like, to limit the resin coating from seeping through the reinforcement layer 30.

Upon coating the reinforcement layer with the resin material directly, the reinforcement layer 30 will include the various resin or matrix materials, and may be placed under heat and pressure to produce the composite layer 50. The composite layer 50 may then be applied to the wheel mold for use in the wheel layup process.

In each of the above methods, the resulting single composite layer 50 includes a continuous fiber reinforcement extending across the width of the composite layer 50. This continuous reinforcement will thereby extend continuously across the width of the wheel 10 that is produced, such that there is no seam or break in the reinforcement layer 30, or an overlap of matrix materials and reinforcing layers. Accordingly, the different portions of the wheel 10 having different temperature or strength requirements can be accommodated with the desired resin formulation in each region that can suit the specific requirements. In this manner, it is not necessary to compromise on the toughness and heat requirements to find a suitable resin that could be applied to all zones. The ability to select a particular resin for the requirement of a particular zone allows for increased toughness capability, increased temperature capability, and reduced cost.

The above description has focused on a single consolidated layer of reinforcement material and matrix materials that are consolidated to define a single consolidated layer 50. It will be appreciated that additional continuous layers can be constructed and layered over each other in the wheel layup process. Unlike the prior art processes, the multiple layers are not spliced together, or overlapping at transitions between matrix materials. Rather, the additional continuous layers can provide additional material to increase the radial thickness of the wheel across its width or at select locations. It is understood a composite single consolidated layer 50 having multiple matrix materials may constitute the entire layer stack or any portion of the layer stack. Equally, the multiple consolidated layers 50 having multiple matrix materials can be positioned anywhere within the entire layer stack.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility.

What is claimed is:

1. A composite wheel structure comprising:
    a wheel body having an axial width extending between an inner end and an outer end;
    an inner flange portion of the wheel body disposed at the inner end;
    an outer flange portion of the wheel body disposed at the outer end;
    a first intermediate portion of the wheel body disposed between the inner flange portion and the outer flange portion;
    a second intermediate portion of the wheel body disposed between the first intermediate portion and the outer flange portion;
    a first reinforcement layer of material extending between the inner and outer ends and extending axially through the inner flange portion, the outer flange portion, the first intermediate portion, and the second intermediate portion;
    wherein the first reinforcement layer is in the form of a single continuous fiber layer;
    a first matrix material integrated with the first reinforcement layer along the inner flange portion, wherein the first matrix material is integrated radially through the first reinforcement layer;
    a second matrix material integrated with the first reinforcement layer along the first intermediate portion, wherein the second matrix material is integrated radially through the first reinforcement layer; and a third matrix material integrated with the first reinforcement layer along the second intermediate portion, wherein the third matrix material is integrated radially through the first reinforcement layer.

2. The wheel structure of claim 1, wherein the outer flange portion and inner flange portion each include the first matrix material.

3. The wheel structure of claim 1, wherein the first matrix material has high toughness and low temperature performance.

4. The wheel structure of claim 3, wherein the second matrix material has high temperature performance and low toughness.

5. The wheel structure of claim 4, wherein the third matrix material has low temperature performance and low toughness.

6. The wheel structure of claim 1, wherein the second matrix material comprises a Bismaleimide polymer and the first and third matrix materials are epoxy.

7. The wheel structure of claim 1, wherein the first reinforcement layer is a carbon fiber fabric, Kevlar, or fiberglass.

8. The wheel structure of claim 1, wherein the first reinforcement layer is seamless across the axial width of the wheel body.

9. The wheel structure of claim 1, wherein the first, second, and third matrix materials are joined with the first reinforcement layer in a single layer, such that the single reinforcement layer includes different matrix materials across its width.

10. The wheel structure of claim 1 further comprising at least one additional reinforcement layer overlaying the first reinforcement layer, wherein the at least one additional reinforcement layer is continuous and seamless and includes multiple different integrated matrix materials across an axial width thereof.

11. A method of forming a
composite wheel, the method comprising the steps of:
providing a first reinforcement layer;
applying a first matrix material onto a first portion of a width of the reinforcement layer;
applying a second matrix material onto a second portion of a width of the reinforcement layer; and
consolidating the first and second matrix materials and the reinforcement layer into a single composite layer;
forming a wheel body having an axial width extending between an inner end and an outer end;
forming an inner flange portion of the wheel body disposed at the inner end;
forming an outer flange portion of the wheel body disposed at the outer end;
forming a first intermediate portion of the wheel body disposed between the inner flange portion and the outer flange portion;
forming a second intermediate portion of the wheel body disposed between the first intermediate portion and the outer flange portion;
wherein the first reinforcement layer extends between the inner and outer ends and extends axially through the inner flange portion, the outer flange portion, the first intermediate portion, and the second intermediate portion;
wherein the first reinforcement layer is in the form of a single continuous fiber layer;
wherein the first matrix material is integrated with the first reinforcement layer along the inner flange portion, wherein the first matrix material is integrated radially through the first reinforcement layer;
wherein the second matrix material is integrated with the first reinforcement layer along the first intermediate portion, wherein the second matrix material is integrated radially through the first reinforcement layer; and
wherein a third matrix material is integrated with the first reinforcement layer along the second intermediate portion, wherein the third matrix material is integrated radially through the first reinforcement layer.

12. The method of claim 11, wherein the step of consolidating includes prepregging the reinforcement layer with the first and second matrix materials.

13. The method of claim 11, wherein the step of consolidating includes applying pressure and heat to the reinforcement layer and the first and second matrix materials.

14. The method of claim 11, wherein the step of consolidating includes using a resin film infusion process.

15. The method of claim 11 further comprising:
providing a substrate having a length and a width;
applying the first matrix material to the substrate across a first portion of the width;
applying the second matrix material to the substrate across a second portion of the width;
defining a single resin film that includes the first and second matrix materials applied to the substrate;
wherein the steps of applying the first and second matrix materials includes overlaying the single resin film on the reinforcement layer.

16. The method of claim 11 further comprising:
providing a first substrate having a length and a width;
applying the first matrix material to the first substrate across the width thereof;
providing a second substrate having a length and a width;
applying the second matrix material to the second substrate across the width thereof;
defining a first resin film that includes the first matrix material applied to the first substrate;
defining a second resin film that includes the second matrix material and the second substrate;
wherein the steps of applying the first and second matrix materials includes overlaying the first resin film and the second resin film onto the reinforcement layer.

17. The method of claim 11, wherein the first matrix material and the second matrix material are applied to the reinforcement layer side-by-side during a first time period.

18. The method of claim 16, wherein the first matrix material and the second matrix material are applied to the reinforcement layer side-by-side, with the first matrix material applied during a first time period and the second matrix material applied during a second time period.

19. The method of claim 11, wherein the single composite layer is formed with the single reinforcement layer impregnated with first and second matrix materials across the width of the reinforcement layer, wherein the first and second matrix materials do not overlap across the width of the reinforcement layer, and the reinforcement layer is seamless.

20. The method of claim 11, wherein the first and second matrix materials are applied to the reinforcement layer using a direct reinforcement coating process in which the first and second matrix materials are directly applied to the reinforcement layer without previously applying the matrix materials to a substrate.

* * * * *